April 24, 1956 T. A. ST. CLAIR 2,742,764
LIQUID AMMONIA FLOW SYSTEM AND VALVE
Filed Oct. 15, 1952 3 Sheets-Sheet 1

INVENTOR.
THEODORE A. ST. CLAIR
BY
RICHEY, WATTS, EDGERTON & McNENNY
H. F. McNenny
ATTORNEYS April 24, 1956     T. A. ST. CLAIR     2,742,764
LIQUID AMMONIA FLOW SYSTEM AND VALVE
Filed Oct. 15, 1952     3 Sheets-Sheet 2

INVENTOR.
THEODORE A. ST. CLAIR
BY
RICHEY, WATTS, EDGERTON & McNENNY
ATTORNEYS

April 24, 1956 T. A. ST. CLAIR 2,742,764
LIQUID AMMONIA FLOW SYSTEM AND VALVE
Filed Oct. 15, 1952 3 Sheets-Sheet 3

INVENTOR.
THEODORE A. ST. CLAIR
BY
RICHEY, WATTS, EDGERTON & McNENNY
ATTORNEYS

United States Patent Office 2,742,764
Patented Apr. 24, 1956

2,742,764
LIQUID AMMONIA FLOW SYSTEM AND VALVE

Theodore A. St. Clair, South Euclid, Ohio, assignor to The Weatherhead Company, Cleveland, Ohio, a corporation of Ohio Application October 15, 1952, Serial No. 314,835

6 Claims. (Cl. 62—1)

This invention relates to apparatus for regulating the flow of fluid under pressure and, more particularly, to accurately regulating the flow of fluids over wide ranges of inlet and outlet pressures.

Recent developments in the art of soil fertilization have included the direct addition of anhydrous ammonia gas to the soil. Since the pressure in a supply tank of liquid ammonia may vary as much as 120 pounds per square inch during a single day, the controlling and metering of the liquid anhydrous ammonia is rendered difficult. Numerous attempts to solve the problems presented by the wide variation in supply pressure have been made. Most of such efforts have included the use of a metering orifice, and it has been found that accurate metering may be obtained if the system is so arranged that the anhydrous ammonia is maintained in a liquid state as it is fed to the metering orifice providing, however, that the pressure drop across the metering orifice is maintained constant.

Among the prior art proposals for controlling the flow of the liquid anhydrous ammonia is a system wherein the ammonia, in its liquid state, is fed to the metering orifice and hence through a differential pressure regulator, which pressure regulator has one side thereof connected to the supply line in advance of the metering orifice. It has been found that in such devices, however, certain metering difficulties occur because varying inlet and outlet pressures adversely affect differential pressure control.

According to the present invention, the liquid anhydrous ammonia is maintained in its liquid state on both sides of the metering orifice while the pressure drop across the orifice is maintained substantially constant. The liquid does not tend to change over into the gaseous state until it is discharged from the regulating apparatus. The large pressure drop takes place at the outlet valve of the regulating apparatus thereby confining the vaporization of this area and, also, providing for the withdrawal of some of the latent heat of vaporization which ocols the device and assists in preventing the formation of any gaseous fluid therein.

To prevent any flashover of the liquid into the gaseous state, the pressure drop within the metering apparatus is maintained at a small value, particularly across the metering orifice. Again, the accuracy of the apparatus is determined by the accuracy of the control of the pressure drop across the metering orifice so a differential regulator is used to provide a substantially constant pressure drop across the orifice. Since this regulator encounters nothing but liquid and since the pressure drop is small, the resulting regulation is very accurate so the apparatus provided herein results in very accurate metering of the flow of liquid.

Although this invention is particularly adapted for use with liquefied anhydrous ammonia, it is equally useful for use with any liquid where accurate metering is desired over a wide range of inlet and outlet pressures.

It is a principal object of this invention to provide a metering apparatus for liquefied gases which prevents any flashover of the liquid into the gaseous state within the metering apparatus, and which provides accurate metering of the liquid over wide ranges of inlet and outlet pressures.

It is another object of this invention to provide a metering apparatus for regulating a desired flow of fluids in either the liquid or gaseous state wherein the desired flow is measured in terms of volume.

It is another object of this invention to provide a metering apparatus for liquefied gases wherein the apparatus is cooled by latent heat of evaporation thereby reducing any evaporation which would hinder accurate metering.

It is still another object of this invention to provide a metering apparatus wherein the pressure drop across the metering orifice is maintained at a low value to prevent evaporation.

It is still another object of this invention to provide a metering apparatus wherein the pressure drop across the metering orifice is accurately maintained.

The foregoing and other objects and advantages will become apparent in view of the following description taken in conjunction with the drawings, wherein.

A preferred embodiment of this invention provides a regulating apparatus for liquefied anhydrous ammonia having an inlet and outlet, a differential pressure regulator adjacent to the inlet, a differential pressure regulator adjacent to the outlet, and a metering orifice, wherein both of the regulators serve to provide a constant pressure drop across the orifice, with the secondary regulator maintaining the system under a pressure related to the supply pressure.

Figure 1:
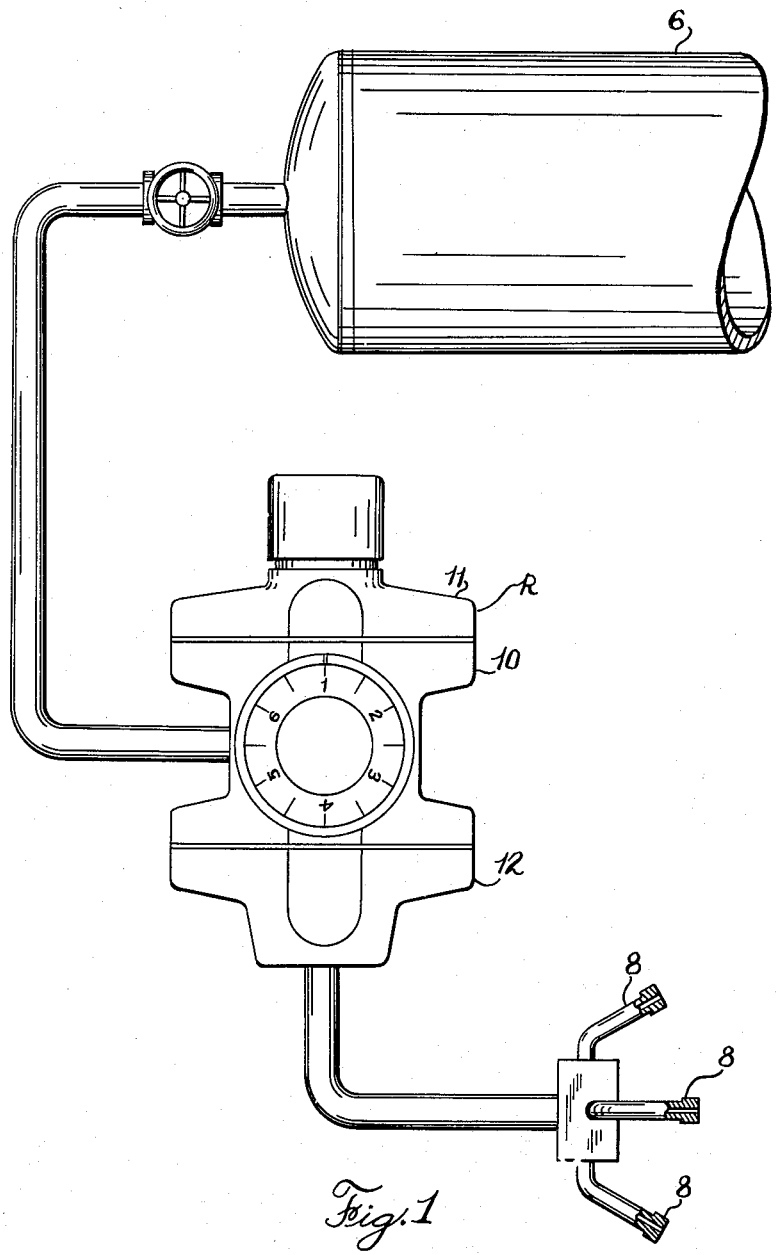
Fig. 1 is a diagrammatic view schematically showing a regulator, according to this invention, applied to a system for injecting anhydrous ammonia into soil.

Referring to the drawings, Fig. 1 discloses the environment of the metering apparatus, wherein a supply tank 6 containing liquefied anhydrous ammonia is connected to the metering apparatus R. The flow of the anhydrous ammonia is controlled in the metering apparatus and exhausted into the nozzles 8 which are adapted for the injection of the anhydrous ammonia into the soil to be fertilized.

Figure 2:
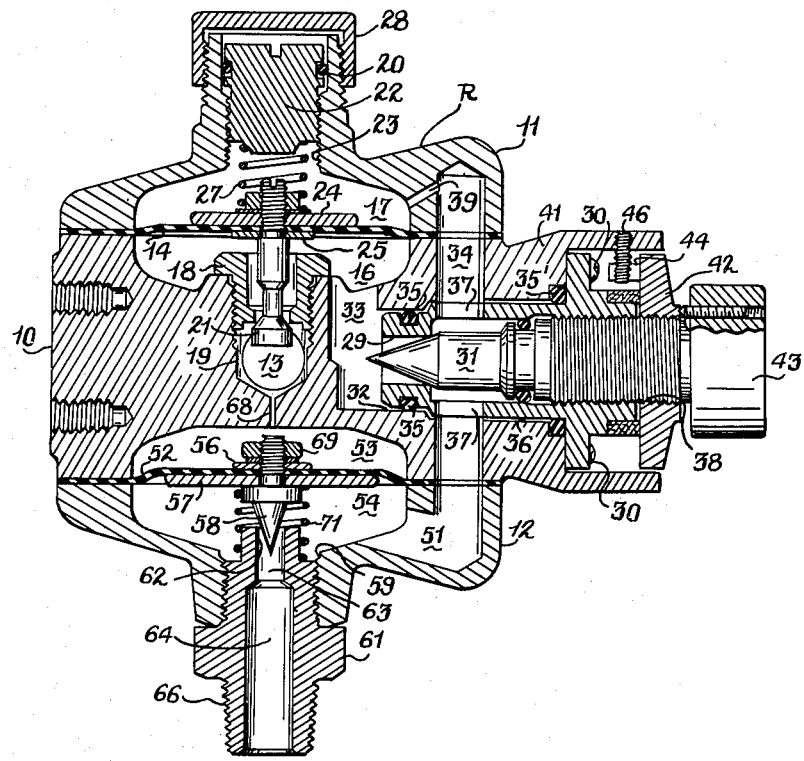
Fig. 2 is a side elevation, in section, of the metering apparatus according to this invention.

The metering apparatus R is comprised of a main body member 10, a first differential regulator body cap 11 and a second differential regulator body cap 12. Referring to Fig. 2, the main body member 10 is formed with an inlet 13 having screw means so that the metering device may be attached to a source of liquid anhydrous ammonia. Any suitable piping means can be used to connect the supply to the inlet 13. The main body 10, in conjunction with the first differential regulator body cap 11, form the housing for the first differential regulator which includes a diaphragm 14 that divides the regulator into the high pressure chamber 16 and the low pressure chamber 17. A valve seat member 18 is threaded into the bore 19 which communicates with the inlet 13 and the high pressure chamber 16. A valve closing member 21 is arranged for movement with the diaphragm 14 and provides a means for engaging the valve seat member 18 to regulate the flow between the inlet 13 and the high pressure chamber 16. An adjustable spring retainer 22 is mounted for axial motion within the spring retainer bore 23 formed in the first regulator body cap 11 and is provided with a seal 20 to provide a fluid seal therebetween. Diaphragm clamping plates 24 and 25 are disposed on either side of the diaphragm 14 and provide means for clamping the diaphragm 14 and non-resilient surfaces for the mounting of the valve member 21. A spring 27 is disposed between the spring retainer 22 and the diaphragm clamping plate 24 and is arranged to bias the diaphragm toward the valve seat member 18 tending to move the valve member 21 away from the valve seat member 18 thereby establishing communication between the inlet 13 and the high pressure chamber 16. A cap 28 is mounted over the bore 23 providing means to close the bore 23 at its upper end.

A metering orifice member 29 and an adjustable regulating member 31 are located in the main body 10. The orifice member 29 is located and secured by the screws 30 in the bore 32 which connects the passages 33 and 34 formed in the main body 10. The orifice member, also, extends into the enlarged bore 36 which is axially aligned with the bore 32 and is provided with apertures 37 aligned with the passageway 34. The orifice member 29 has internal threads 38 engaging corresponding threads on the regulating member 31 and provides means for axially adjusting the regulating member. Seals 35 and 35' provide a fluid seal between the orifice member 29 and the walls of the bores 32 and 36 respectively. The large bore of the orifice member 29 is in communication with the low pressure chamber 17 through the passages 34 and the bleeder passage 39. This arrangement permits the control of the flow through the orifice, since the differential pressure between the high and low pressure chambers 16 and 17 is equal to the pressure drop across the orifice.

An annular flange 41 is formed in the main body 10 axially aligned with the bore 36 surrounding the calibrated plate 42 attached to the regulating member 31. Any suitable handle arrangement such as the knob 43 may also be attached or formed integrally with the regulator member 31 to permit rotation and adjustment of the regulating member. Suitable markings may be formed on the end surface of the flange 41 which in cooperation with markings on the calibrating plate 42 permit the user to adjust the orifice for any desired rate of flow. Any suitable stop means may be provided to prevent excessive rotation of the regulator member. In the preferred embodiment, a pin 44 is located in the calibrating plate 42 and is arranged to engage a second pin 46 removably secured in the flange 41.

The passage 34 discharges through the passage 51 into the low pressure side of a second differential regulator formed by the second differential regulator body cap 12 in conjunction with the main body 10 and which is divided by the flexible diaphragm 52 into a high pressure chamber 53 and a low pressure chamber 54.

Clamping plates 56 and 57 are located on either side of the diaphragm 52 to provide stiffening for the diaphragm and a non-resilient surface for the mounting of the valve member 58. A threaded bore 59 is formed in the second differential regulator body cap 12 for the reception of the outlet fitting 61. A valve seat 62 is formed in the outlet fitting 61 and in conjunction with the valve member 58 forms the outlet valve of the second differential regulator. The axial bores 63 and 64 provide a fluid passageway for the regulated fluid. Suitable connecting means such as the threads 66 are provided for the attachment of any conventional fluid conducting means. A passageway 68 connects the inlet 13 with the high pressure chamber 53 to reference the second differential regulator to the inlet pressure. The valve closure member 58 passes through the diaphragm 52 and the diaphragm plates 56 and 57, is sealed and is secured in position by any suitable means such as the nut 69. A spring 71 is disposed between the outlet fitting 61 and the clamping plate 57 and tends to bias the diaphragm away from the outlet fitting thereby moving the valve member 58 away from the valve seat 62 tending to open the outlet valve. This arrangement provides a second differential regulator to regulate the pressure at the discharge side of the orifice member 29, relative to the inlet pressure of the inlet 13, and serves to provide a metering device wherein the pressure is closely related to the pressure of the fluid source.

In operation the fluid flows from the source through the inlet 13 past the valve seat member 18 into the high pressure chamber 16 of the first differential regulator. From the high pressure chamber, the fluid flows along the passage 33 through the orifice member 29 into the passage 34. Since the passage 34 is connected to the low pressure chamber 17 of the first differential regulator, the pressure drop across the orifice is maintained equal to the differential between the pressure in the chamber 16 and the chamber 17. The differential between these two chambers is controlled by the spring 27 which supplements the fluid pressure along the upper side of the diaphragm 14 tending to bias the valve member 21 away from the valve seat 18. Since the passage 34 is also in communication with the low pressure chamber 54 of the second differential regulator and since the second differential regulator maintains the low pressure chamber 54 in a definite relationship with the pressure in the inlet 13, the discharge through the orifice in member 29 is maintained in a definite relationship with the inlet pressure. Since the spring 71 tends to bias the diaphragm 52 away from the valve seat 62 thereby supplementing the fluid pressure on the under side of the diaphragm 52, the pressure in the chamber 54 is at a lower pressure than the chamber 53. The relationship between the pressures in the two chambers is therefore a direct function of the force of the spring 71. Very accurate metering of the fluid is obtained since the second differential regulator maintains the fluid pressure on both sides of the orifice in member 29 at a pressure closely related to the inlet pressure thereby preventing the flashover or presence of any gaseous fluid in the metering apparatus. The preferred relationship of the device is that the differential pressure in the first differential regulator must be smaller than the pressure differential in the second differential regulator.

Since the pressure in the bore 64 is substantially below the pressure in the chamber 54 in fertilizing applications of this metering device, some evaporation of the fluid occurs in the bores 63 and 64. This evaporation, of course, cools the outer fitting 61 which, in turn, cools the regulator body cap 12 and the main body 10 partially through the bolts (not shown) connecting cap 12 to body 10 thereby providing additional protection against any gaseous fluid being present in the orifice 29.

By adjusting the regulating member 31 axially relative to the orifice in member 29, various flows may be metered at any given pressure drop across the orifice. By providing a device wherein the pressure drop across the orifice is maintained at a constant value regardless of the inlet pressure, it is possible to calibrate the settings of the regulating member 31, relative to the orifice 29, so that a given rate of flow will be maintained at a given setting of the regulating member 31 regardless of the inlet pressure.

Figure 3:
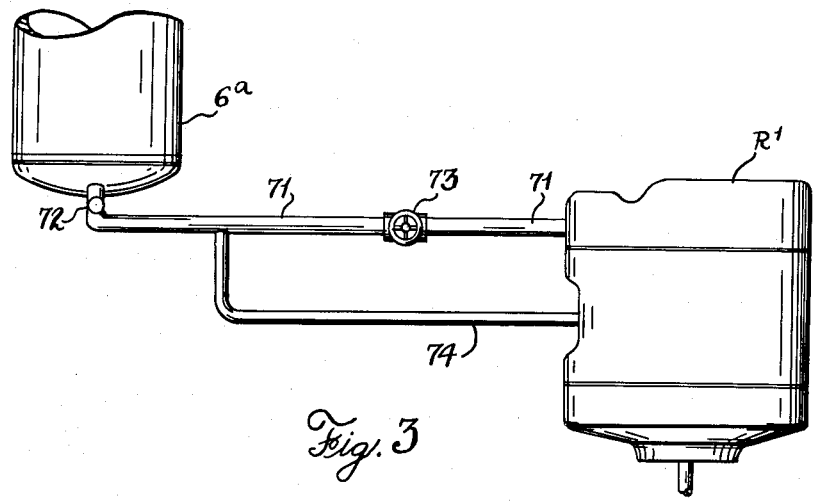
Fig. 3 is a diagrammatic view schematically showing another embodiment of this invention wherein the orifice is remote from the regulator.
Figure 4:
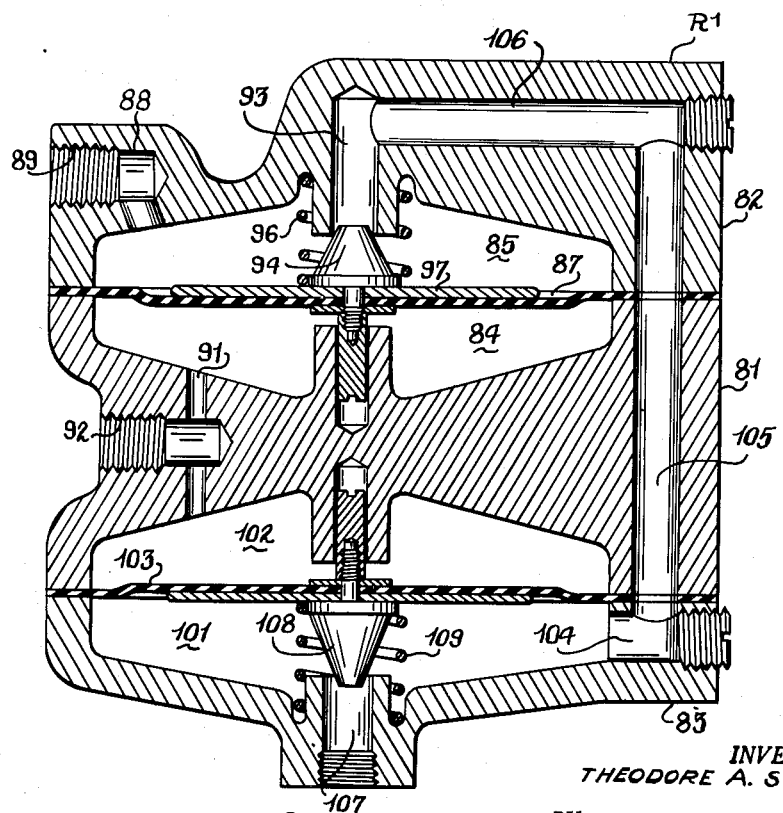
Fig. 4 is a sectional view showing the details of construction of the embodiment shown in Fig. 3.

In the embodiment shown in Figs. 3 and 4, the regulator is adapted for use in connection with a system wherein the metering orifice is located externally of the regulator.

Referring to Fig. 3, the tank 6a containing liquefied anhydrous ammonia is connected to the regulator R1 by the line 71. A valve 72 may be provided at the tank 6a to provide for isolating the tank from the regulating portion of the system. A metering orifice 73 is located in the line 71 between the valve 72 and the regulator R1 and is preferably of the type which will provide for adjustment of the orifice size to vary the flow of the liquefied gas. A second line 74 connects the line 71 between the valve 72 and the orifice 73 with the regulator R1 and provides for referencing the regulator R1 to the pressure within the tank 6a.

Referring to Fig. 4, the regulator R1 is comprised of a main body 81, a first regulator cap 82 and a second regulator cap 83. The first regulator cap 82, in cooperation with the body 81, defines a first differential pressure regulator which is divided into a high pressure chamber 84 and a low pressure chamber 86 by a flexible diaphragm 87. The low pressure chamber 85 is provided with an inlet 88 which is attached to the line 71 by means of the threads 89. The high pressure chamber 84 is provided with a referencing passage 91 which is attached to the line 74 by means of the threads 92. An outlet passage 93 is formed in the upper body cap 82. The valve 94 attached to the diaphragm 87 is adapted to close the passage 93. A spring 96 is positioned between the first regulator cap 82 and the backing plate 97 and tends to urge the diaphragm 87 and the valve 94 away from the inlet of the passage 93.

The second regulator cap 83 in cooperation with the body 81 forms a second differential pressure regulator which is divided into a low pressure chamber 101 and a high pressure chamber 102 by a thin flexible diaphragm 103. The low pressure chamber 101 is in fluid communication through the passageways 104, 105 and 106 with the passage 93. The low pressure chamber 101 is provided with an outlet 107 which is adapted to be closed by the valve member 108 which is attached to the diaphragm 103. A spring 109 is provided to urge the diaphragm 103 and the valve member 108 away from the outlet 107. The high pressure chamber 102 of the second differential pressure regulator is also referenced through the passage 91 to the pressure of the tank 6a. The regulator in the embodiment disclosed in Fig. 4, like the regulator disclosed in Fig. 2, provides a first differential pressure regulator to regulate the pressure drop across the metering orifice and a second differential pressure regulator to regulate the exhaust pressure of the regulator in a constant relationship with the pressure within the tank 6a. Since the large pressure drop occurs at the outlet 107, the evaporation of the liquefied gas is confined to this point and a substantial amount of cooling of the regulator occurs due to this evaporation.

In either embodiment, when metering a volatile liquid, the regulation of the entire apparatus is accurately maintained due to the fact that only liquid is present within the metering apparatus. The second differential regulator maintains the discharge pressure of the apparatus in a constant relationship with the source of pressure therefore confining any evaporation which may take place to the discharge bores 63 and 64 where the large pressure drop is present. No inaccuracies occur due to partial flashing over of the liquid into a gaseous state at the discharge valve of the second differential regulator because the flow is metered ahead of that point in the solid liquid. Since the pressure of the discharge side of the metering orifice has a relatively constant relationship to the source of pressure of the liquid and since the pressure drop across the regulating orifice is maintained at a minimum, the pressure drop across the regulating valve of the first differential regulator only varies by that amount of variation which is present in the second differential regulator. Again, since the pressure drop across the regulating valve of the first differential regulator is relatively constant, the effect of the pressure drop on the differential area of the diaphragm due to the regulating valve itself remains effectively constant so a high degree of accuracy is maintained in the first differential regulator. Further, since the fluid regulated by the first differential regulator is exclusively liquid, a high degree of accuracy may be maintained and very small variations are necessary in the valve opening of the first differential regulator to maintain the proper pressure drop. If a mixture of gas and liquid were present in the first differential regulator, it would require large fluctuations of the regulating valve to maintain the correct pressure drop which would create inaccuracies in regulation. Of course, the metering of the regulating orifice is very accurate when only liquid is present and the pressure drop is maintained constant.

The outlet pressure has little or no effect on the regulation of the flow since even large changes in the exhaust pressure will only effect small changes in the pressure in the low pressure chamber of the second differential pressure regulator since the effective area of the second regulator valve is small relative to the effective area of the associated diaphragm. The effect of variation in the low pressure chamber of the second regulator due to variations in outlet pressure are more than adequately compensated for by the first regulator as described above so extreme accuracy is maintained over large ranges of outlet pressure. It has been found by actual tests that changing outlet pressure from atmospheric pressure to a pressure closely related to the pressure in the low pressure chamber of the second regulator has no measurable effect on the regulated flow.

Because evaporation will take place within the bores 63 and 64, the outlet fitting 61 will be cooled. This cooling will necessarily result in cooling of the entire regulating apparatus and results in ample protection against any possibility of vaporization within the metering apparatus. In actual test it has been found that the entire regulator is often cooled to as low as 35° F. with ambient atmospheric temperatures about 85° F. under normal atmospheric condition so the possibility of flashing over within the regulator is eliminated.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A regulating valve for liquid anhydrous ammonia comprising a valve body having an inlet, a differential pressure regulator in communication with said inlet, a passageway leading from said pressure regulator to a metering orifice, a passageway leading from said metering orifice to a second pressure regulator, a passageway leading from said second-named passageway into said first pressure regulator on that side of the diaphragm thereof opposite the inlet, and a passageway leading from said inlet to said second pressure regulator on that side of the diaphragm thereof opposite said outlet whereby liquid anhydrous ammonia is maintained in its liquid state on both sides of said metering orifice and the pressure drop across said orifice is maintained constant.

2. A regulating valve for liquid anhydrous ammonia comprising a central valve body having an inlet, a bore in the body normal to the inlet, a regulator valve disposed at one end of said bore, a diaphragm chamber in the body surrounding said regulator valve, a diaphragm cap and a diaphragm secured to said body and to said regulator valve respectively, a passageway leading from said diaphragm chamber to a metering orifice, a second bore in said body normal to the inlet, a second diaphragm chamber formed in the body in fluid communication with said second bore, a diaphragm and diaphragm cap secured to said body at said second diaphragm chamber, a passageway leading from said metering orifice into said last-named diaphragm cap, and a passageway from said inlet to said second diaphragm chamber, whereby said last-named diaphragm is subjected at one side thereof to inlet pressure and at the other side thereof to the pressure at the exit side of said metering orifice, and a passageway leading from the exit side of said metering orifice to the side of the first-named diaphragm remote from the inlet whereby said first-named diaphragm is subjected at one side thereof to the pressure before said metering orifice and at the other side thereof to the pressure at the exit side of said metering orifice.

3. Apparatus for controlling the flow of liquefied gas such as liquid anhydrous ammonia comprising a body having an inlet chamber, an inlet regulator and an outlet regulator, said inlet regulator including a diaphragm subjected to inlet pressure and a valve closure member connected to said diaphragm, a passageway leading from the inlet side of said diaphragm to a metering orifice, said metering orifice having an inlet opening and an exit opening, an exit chamber around said metering orifice exit opening, a passageway leading from said exit chamber to that side of said diaphragm remote from said inlet chamber, said exit regulator including a diaphragm, a passageway leading from an inlet chamber to said last-named diaphragm so as to subject the same at one side thereof to inlet pressure, and a second passageway leading from said exit chamber to the other side of said last-named diaphragm whereby said gas is maintained in its liquid state on both sides of said metering orifice and the pressure drop across said metering orifice is maintained constant.

4. A regulating valve for metering liquefied gases comprising an inlet, an outlet and a reference passage, a first differential pressure regulator employing a diaphragm in communication with said inlet on one side of said diaphragm and with said reference passage on the other side of said diaphragm, a second differential pressure regulator employing a diaphragm in communication with said outlet on one side of said diaphragm and with said reference passage on the other side of said diaphragm, and a passage providing communication between the first differential pressure regulator on the side of the diaphragm communicating with the inlet and the second differential pressure regulator on the side of the diaphragm communicating with the outlet.

5. An apparatus for metering liquefied gases comprising an orifice and a regulating valve having an inlet, an outlet and a reference passage, said inlet being in communication with the exhaust side of said orifice, said reference passage being in communication with the inlet side of said orifice; said regulating valve comprising a first differential pressure regulator employing a diaphragm in communication with said inlet on one side of said diaphragm and with said reference passage on the other side of said diaphragm, a second differential pressure regulator employing a diaphragm in communication with said outlet on one side of said diaphragm and with said reference passage on the other side of said diaphragm, and a passage providing communication between the first differential pressure regulator on the side of the diaphragm communicating with the inlet and the second differential pressure regulator on the side of the diaphragm communicating with the outlet.

6. In a valve for regulating the flow of a liquefied gas such as liquefied anhydrous ammonia comprising a valve body having an inlet and an outlet, a metering orifice in said body having an inlet side communicating with said inlet, a first pressure regulator having a diaphragm one side of which communicates with the inlet side of said metering orifice, a second pressure regulator having a diaphragm communicating with said valve inlet at one side thereof, and passageways leading from the exit side of said metering orifice to the opposite sides of said diaphragms, whereby the gas is maintained in a liquid stage at both sides of said metering orifice and the pressure drop across said orifice is maintained constant.

References Cited in the file of this patent

UNITED STATES PATENTS

| | | |
|---|---|---|
| 2,248,222 | Ensign | July 8, 1941 |
| 2,272,341 | Holzapfel | Feb. 10, 1942 |